(12) United States Patent  
Grover et al.

(10) Patent No.: US 12,073,336 B2  
(45) Date of Patent: Aug. 27, 2024

(54) INVENTORY TRACKING USING BLOCKCHAIN

(71) Applicant: MICRO FOCUS LLC, Santa Clara, CA (US)

(72) Inventors: Douglas Max Grover, Provo, UT (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 324 days.

(21) Appl. No.: 17/565,197

(22) Filed: Dec. 29, 2021

(65) Prior Publication Data

US 2023/0206173 A1  Jun. 29, 2023

(51) Int. Cl.
*G06K 7/14* (2006.01)
*G06K 7/10* (2006.01)
*G06Q 10/087* (2023.01)

(52) U.S. Cl.
CPC ....... *G06Q 10/087* (2013.01); *G06K 7/10366* (2013.01); *G06K 7/1413* (2013.01)

(58) Field of Classification Search
CPC . G06Q 10/087; G06K 7/10366; G06K 7/1413
See application file for complete search history.

(56) References Cited

U.S. PATENT DOCUMENTS

| 10,628,906 | B2 | 4/2020 | Zachary | |
| 2019/0363884 | A1* | 11/2019 | Johnson | .................... H04L 9/32 |
| 2019/0363890 | A1* | 11/2019 | Johnson | ............... H04L 9/0891 |
| 2019/0385269 | A1 | 12/2019 | Zachary | |
| 2020/0057980 | A1* | 2/2020 | Perkowitz | ................. H04L 9/50 |
| 2021/0201236 | A1* | 7/2021 | Makhija | ................. G06F 16/27 |
| 2023/0206173 | A1* | 6/2023 | Grover | ............... G06K 7/10366 |
| | | | | 705/28 |

FOREIGN PATENT DOCUMENTS

| CN | 112104749 B | 2/2021 |
| WO | WO-2021169455 A1 | 9/2021 |

* cited by examiner

*Primary Examiner* — Eliyah S. Harper
(74) *Attorney, Agent, or Firm* — Sheridan Ross P.C.

(57) ABSTRACT

A first sub-blockchain and a second sub-blockchain are retrieved. The sub-blockchains are predefined fragments of a blockchain that are intended to be used to build a larger blockchain. At least one of the first sub-blockchain and the second sub-blockchain was originally stored in a read-only computer memory or was originally stored in a barcode/RFID tag. A blockchain that comprises the first sub-blockchain and the second sub-blockchain is created. The blockchain is used to track inventory of a product.

20 Claims, 8 Drawing Sheets

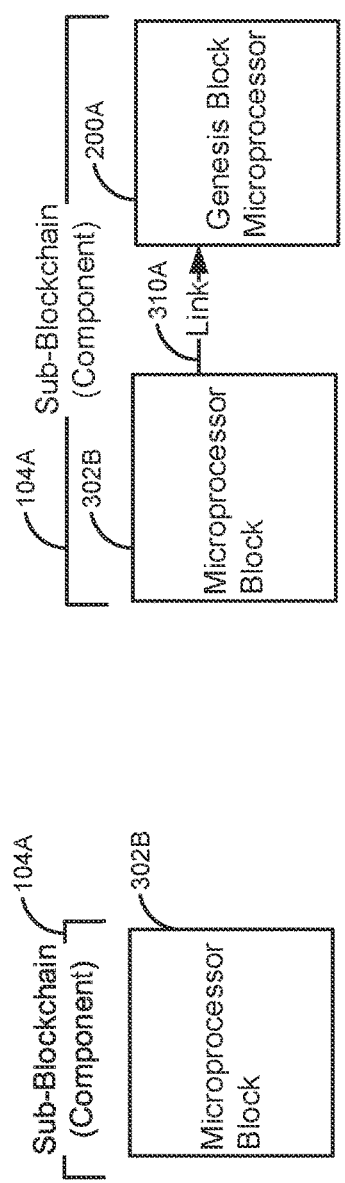
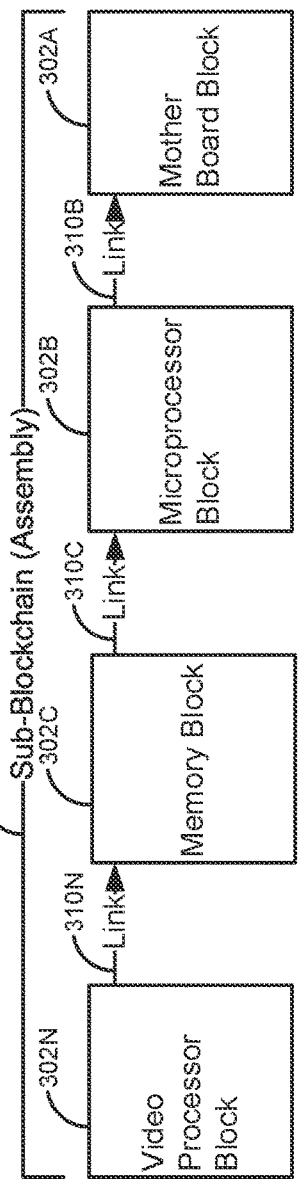
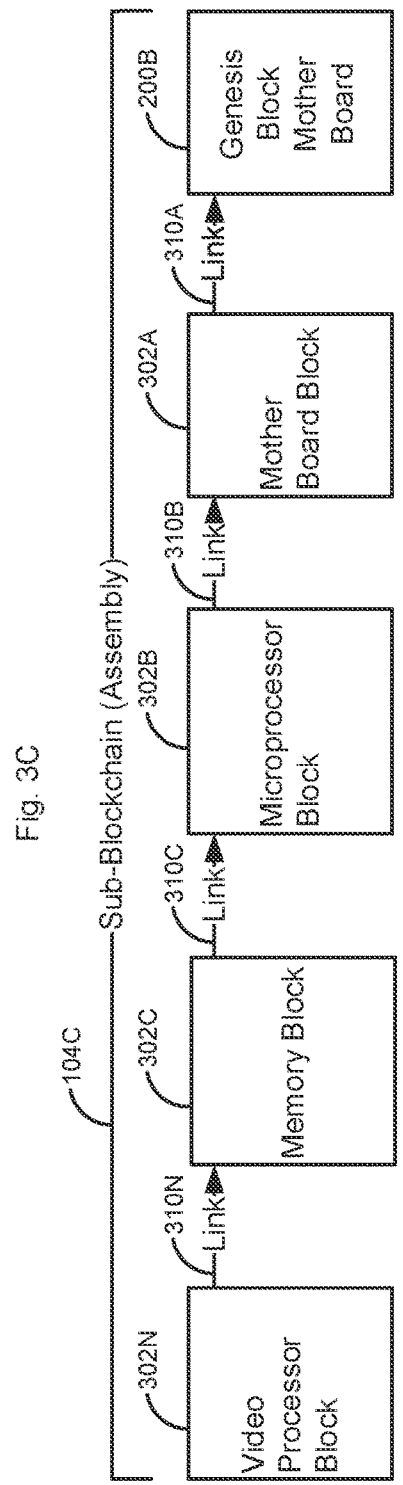
Fig. 3A
Fig. 3B
Fig. 3C
Fig. 3D

INVENTORY TRACKING USING BLOCKCHAIN

FIELD

The disclosure relates generally to blockchains and particularly to methods and apparatuses for tracking inventory using blockchain technology.

BACKGROUND

Being able to track computer inventory and configurations poses difficulties because the configurations comprise many raw components. In addition, computers consist of many hardware assemblies and may even include raw components without any current tracking information (e.g., a microprocessor or memory chips). Other hardware assemblies come pre-manufactured (e.g., a hard disk). These assemblies then get combined into a larger system, such as, a personal computer. Being able to track the full component list, including manufacturer, history of devices changes, and addition of assemblies/devices is not a simple task.

SUMMARY

These and other needs are addressed by the various embodiments and configurations of the present disclosure. The present disclosure can provide a number of advantages depending on the particular configuration. These and other advantages will be apparent from the disclosure contained herein.

A first sub-blockchain and a second sub-blockchain are retrieved. The sub-blockchains are predefined fragments of a blockchain that are intended to be used to build a larger blockchain. At least one of the first sub-blockchain and the second sub-blockchain was originally stored in a read-only computer memory or was originally stored in a barcode/RFID tag. A blockchain that comprises the first sub-blockchain and the second sub-blockchain is created. The blockchain is used to track inventory of a product.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

As described herein and in the claims, an assembly sub-blockchain may comprise a block for each component in the assembly (or only some of the components). However, in one embodiment, the assembly sub-blockchain may only comprise a single block that represents the assembly.

As described herein and in the claims, a device sub-blockchain may comprise a block for each component in the device (or only some of the components). However, in one embodiment, the device sub-blockchain may only comprise a single block that represents the device.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 3A is a diagram of a sub-blockchain for a single component block without a genesis block.

FIG. 3B is a diagram of a sub-blockchain for a single component block with a genesis block.

FIG. 3C is a diagram of an assembly sub-blockchain that comprises a plurality of single component blocks without a genesis block.

FIG. 3D is a diagram of an assembly sub-blockchain that comprises a plurality of single component blocks and a genesis block.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
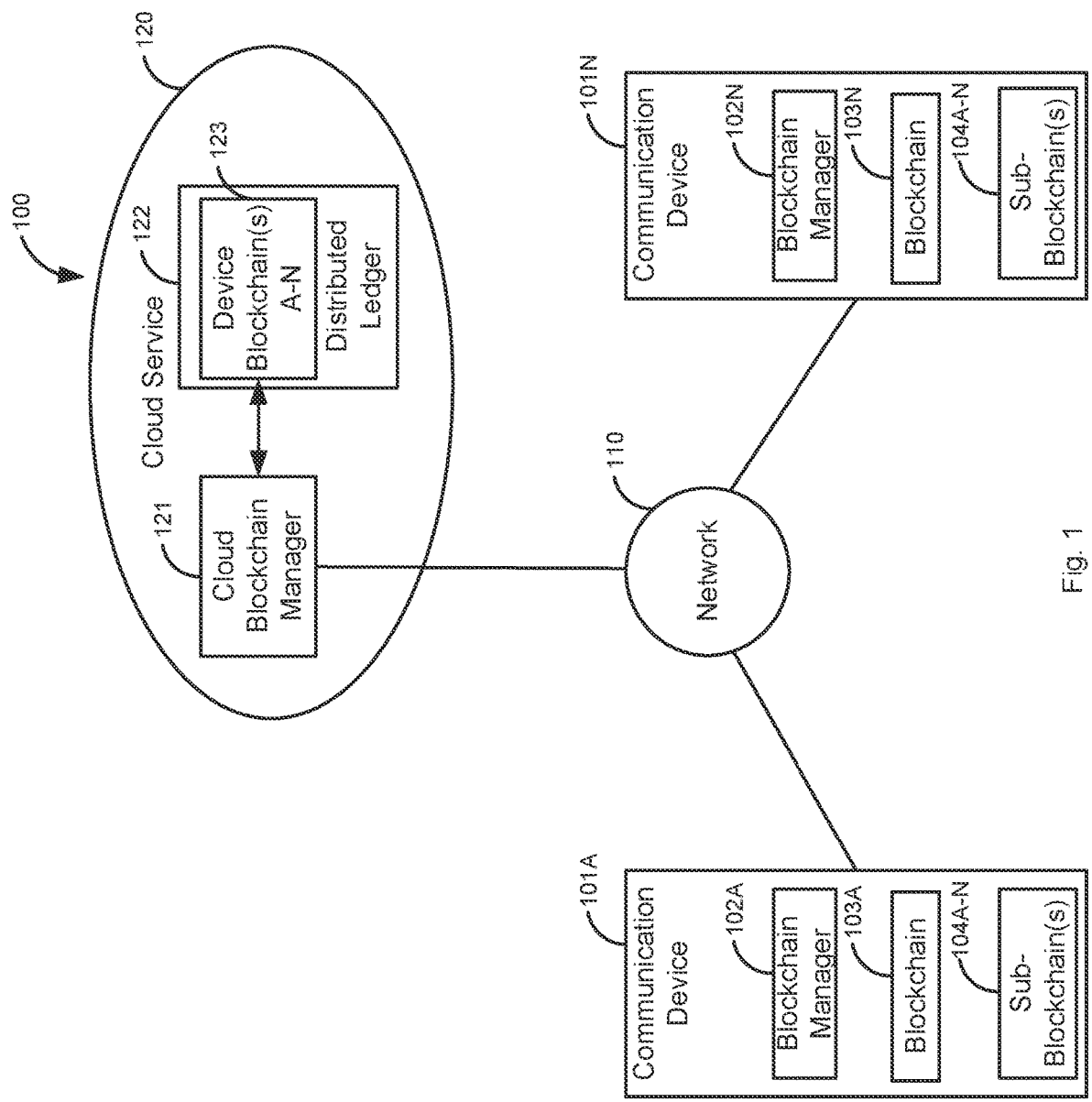
FIG. 1 is a block diagram of a first illustrative system for tracking inventory using a blockchain.

FIG. 1 is a block diagram of a first illustrative system 100 for tracking inventory using a blockchain 103. The first illustrative system 100 comprises communication devices 101A-101N, a network 110, and a cloud service 120.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, a server, a gateway, a printer, a scanner, a router, a communication system, a digital assistant, a sensor, an alarm system, a remote control device, a camera, and/or the like. As shown in FIG. 1, any number of communication devices 101A-101N may be connected to the network 110, including only a single communication device 101. The communication devices 101A-101N further comprise blockchain managers 102A-102N, Blockchains 103A-103N, and sub-blockchains 104A-104N.

The blockchain managers 102A-102N can be or may include any hardware coupled with software that can manage the blockchains 103A-103N and the sub-blockchain(s) 104A-104N. The blockchain manager 102A-102N may work in conjunction with the cloud service 120/cloud blockchain manager 121.

The blockchains 103A-103N can be or may include any of the various types of blockchains 103 described herein. The sub-blockchains 104A-104N can be or may include any of the various types of sub-blockchains 104 described herein. In FIG. 1, each of the communication devices 101A-101N are shown as having sub-blockchains 104A-104N. The N indicates that any number of sub-blockchains 104 may exist on each of the communication devices 101A-101N.

The sub-blockchains 104A-104N are predefined fragments of a blockchain 103 that are intended to be used to build a larger blockchain 103. For example, the sub-blockchains 104A-104N on the communication device 101A are used to create a blockchain 103A that has an inventory of the communication device 101A. Likewise, the sub-blockchains 104A-104N on the communication device 101N are used to create the blockchain 103N that has an inventory of the communication device 101N. The sub-blockchains 104A-104N may comprise a single block or multiple blocks. The sub-blockchains 104A-104N differ from traditional blocks that are added to a blockchain 103. With traditional blockchains, individual blocks are created dynamically based on events/transactions. For example, with Bitcoin®, a new block is added dynamically based on a transaction (e.g., a sale of goods). Dynamically added blocks are easily added to a blockchain 103 because the blocks are created on the fly.

In contrast, the sub-blockchains 104A-104N are predefined fragments that are not dynamically created. Combining the sub-blockchains 104A-104N have issues that are not traditionally encountered with traditional blockchains, such as, there may be a genesis block in each fragment (versus a single genesis block in a traditional blockchain), hashing problems (where the hashes need to be added/changed when combined), link changes (adding/removing some links), and/or the like. For example, traditional blockchains only have a single genesis block. The sub-blockchains 104A-104N may each have a genesis block, which results in a blockchain 103 that may have multiple genesis blocks. In this embodiment, a genesis block may have a forward link/hash where traditional blockchains don't have genesis blocks with a forward link/hash. In some embodiments, one or more genesis blocks of the sub-blockchains 104A-104N may be removed so that there is only a single genesis block in the blockchains 103A-103N. Removing a genesis block may require recomputing some of the hash values to create the blockchain 103. For hashing, if the sub-blockchain 104 has multiple blocks, the hashes are calculated based on the first and last blocks (assuming that the sub-blockchain 104 has precomputed hashes for the internal blocks). The hash of the previous field is calculated and placed in a predefined hash field in the first block of the sub-blockchain 104. For forward links the beginning block may have a blank link pointer field that needs to be filed when adding the sub-blockchain 104 to another sub-blockchain 104.

The sub-blockchains 104A-104N (or a portion) may have all the information/blocks minus the hashes (e.g., the information plus the links between blocks). Because the sub-blockchains 104 are typically stored in ROM or read from a barcode/RFID tag, this makes the information immutable. The hashes can then be added to the blocks when the sub-blockchain(s) 104 are added to the blockchain 103. The individual sub-blockchains 104 can be linked to a primary genesis block in a star configuration as shown below in FIG. 5.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The cloud service 120 can be or may include any hardware coupled with software that can provide managed blockchain services, such as, blockchain as a service, a service provider system, a corporate service, and/or the like. The cloud service 120 may be owned by a separate entity (e.g., a separate corporation) from the communication devices, by the same entity, where each communication device 101A-101N and the cloud service 120 are owned by separate entities (e.g., where the communication devices 101 are different tenants of the cloud service 120) and/or the like.

The cloud service 120 comprises a cloud blockchain manager 121, a distributed ledger 122, and device blockchain(s) 123. The cloud blockchain manager 121 can be or may include any hardware coupled with software that can manage the blockchains 103A-103N. The cloud blockchain manager 121 works in conjunction with the blockchain managers 102A-102N to provide backup services/inventory management services for the communication devices 101A-101N. The cloud blockchain manger 121 stores the blockchain(s) 103A-103N as the device blockchains 123. The device blockchain(s) 123 are stored in the distributed ledger 122. The distributed ledger 122 is where the device blockchains 123 are replicated in multiple instances/devices.

Figure 2:
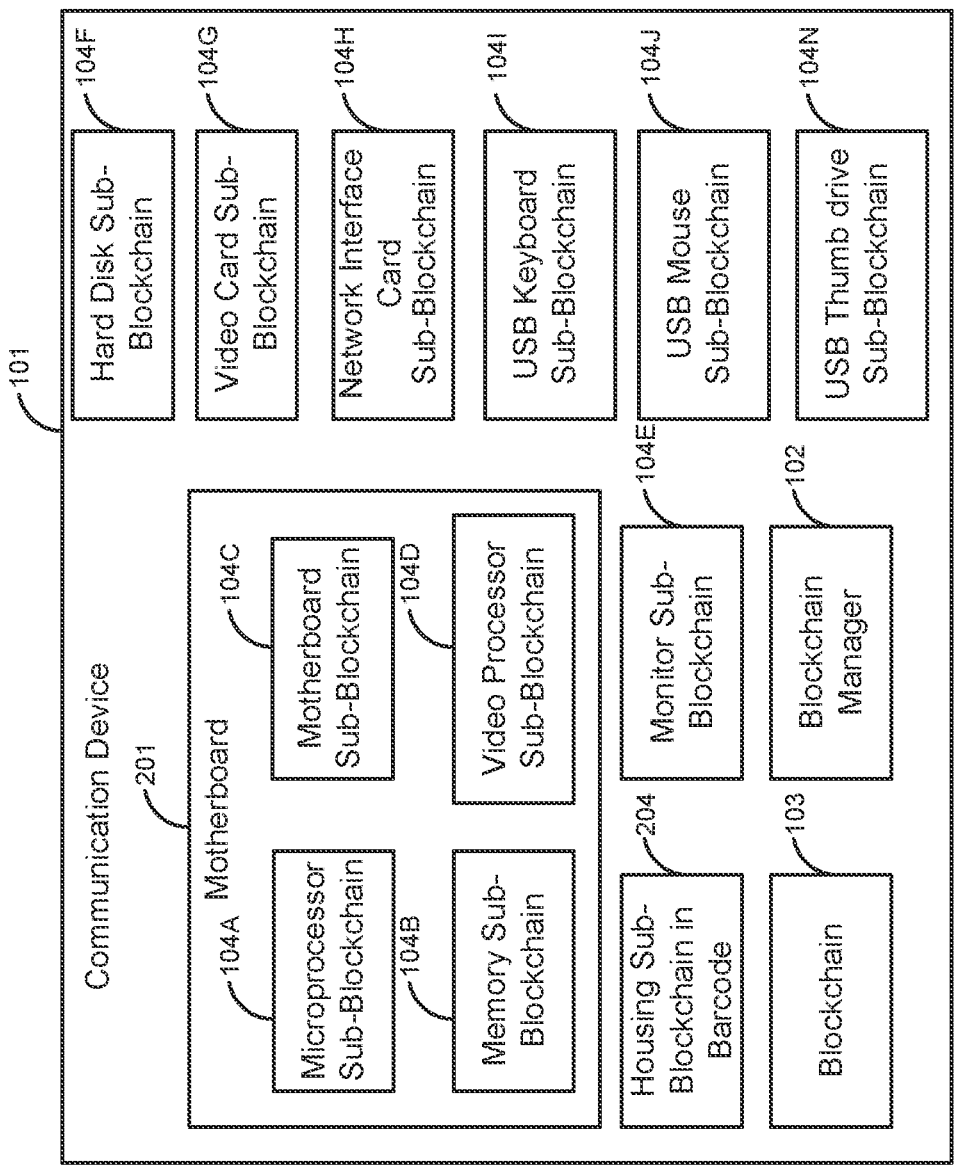
FIG. 2 is a diagram of an exemplary communication device that is used for inventory tracking.

FIG. 2 is a diagram of an exemplary communication device 101 that is used for inventory tracking. While the processes described herein can apply generally to tracking any type of inventory, an exemplary embodiment of tracking inventory of a communication device 101 is used. The communication device 101 comprises a motherboard 201, a microprocessor sub-blockchain 104A, a memory sub-blockchain 104B, a motherboard sub-blockchain 104C, a video processor sub-blockchain 104D, a housing sub-blockchain 204, a monitor sub-blockchain 104E, the blockchain manager 102, the blockchain 103, a hard disk sub-blockchain 104F, a video card sub-blockchain 104G, a network interface card sub-blockchain 104H, a USB keyboard sub-blockchain 104I, a USB mouse sub-blockchain 104J, and a USB thumb drive sub-blockchain 104N.

The motherboard 201 can be or may include any hardware motherboard of a communication device 101. The motherboard 201 is an assembly of hardware components. In this example, the motherboard 201 comprises a microprocessor, a memory, and a video processor. Within the microprocessor is the microprocessor sub-blockchain 104A. The microprocessor sub-blockchain 104A is stored in Read Only Memory (ROM) in the microprocessor. The memory sub-blockchain 104B is also stored in a ROM section of the memory. The video processor sub-blockchain 104D is also stored in a ROM section of the video processor. The motherboard sub-blockchain 104C may comprise a separate sub-blockchain 104 that has any additional components (e.g., computer chips, resistors, capacitors, indictors, etc.). The motherboard sub-blockchain 104C may also comprise the sub-blockchains 104A, 104B, and 104D.

The housing sub-blockchain 204 is a sub-blockchain 204 that has been received via a barcode scanner/Radio Frequency Identification (RFID) scanner. The barcode may include a block (or small sub-blockchain 104 that has an inventory of the assembly) that is part of a barcode (e.g., a Quick Response (QR) code) or in an RFID tag that is scanned. A QR code may contain up to 31,329 bytes of data, which can store a sub-blockchain 204 or information that may be added as a block when the barcode is scanned. When the component/assembly is manufactured it has an attached QR code or RFID tag that is scanned to get the sub-blockchain 204; once scanned, the sub-blockchain 204 is added to the blockchain 103. For example, when the communication device 101 is manufactured, the housing will have a barcode that is scanned to get the housing sub-blockchain 204.

In one embodiment, the QR code/RFID tag may include a public key for the sub-blockchain 204 associated with the component/assembly/device. Once scanned, the public key is used to access the sub-blockchain 204 for the component/assembly/device. The sub-blockchain 204 is then added to the blockchain 103 as an inventory item(s). For example, this process could be used to create a blockchain 103 for a car. Each assembly/component (e.g., an engine) could have a barcode on the engine that has a public key. The car may contain electronic components that are added in the manner described above. If component is replaced (e.g., an alternator), the component may be added to an alternator branch in a star blockchain (e.g., as described in FIG. 5). In this example, individual branches of the star blockchain are based on a type of component/assembly.

In another embodiment, the QR code/RFID tag may include a hash or unique code that is used as a lookup for the respective sub-blockchain 204. In this embodiment, the process can be used to track any type of inventory. For example, the process may be used in manufacturing of automobiles, machines, furniture, etc.

In one embodiment, instead of the sub-blockchain 204, a code/unique identifier may be used to get the actual sub-blockchain 204 for the component/assembly/device. In another embodiment, the block may have a pointer to the actual data. For example, the pointer may point an inventory of all the components in a hard disk.

The monitor sub-blockchain 104E is used to track a monitor for the communication device 101. The monitor sub-blockchain 104E may be stored in ROM in the monitor. The monitor sub-blockchain 104E is an assembly sub-blockchain 104E because the monitor comprises multiple components. The monitor sub-blockchain 104E may also be a device sub-blockchain 104E if the monitor is a pluggable device. A pluggable device may be any device that can be plugged into a device, such as, a USB device, a pluggable card, a pluggable memory, a pluggable computer board, a pluggable microprocessor, and/or the like.

The hard disk sub-blockchain 104F is used to track a hard disk that has been installed in the communication device 101. The hard disk sub-blockchain 104F may be stored in ROM in the hard disk. The hard disk sub-blockchain 104F is an assembly sub-blockchain 104F because the hard disk comprises multiple components. The hard disk sub-blockchain 104F may also be a device sub-blockchain 104 if the hard disk is a pluggable device.

The video card sub-blockchain 104G is used to track a video card that has been installed in the communication device 101. The video card sub-blockchain 104G may be stored in ROM in the video card. The video card sub-blockchain 104G is an assembly sub-blockchain 104G because video card comprises multiple components. The video card sub-blockchain 104G may also be a device sub-blockchain 104 if the video card is a pluggable device.

The USB keyboard sub-blockchain 104I is used to track a keyboard that has been plugged into the communication device 101. The USB keyboard sub-blockchain 104I may be stored in ROM in the USB keyboard. The USB keyboard sub-blockchain 104I is an assembly sub-blockchain 104I because USB keyboard comprises multiple components. The USB keyboard sub-blockchain 104I is also a device sub-blockchain 104 because the USB keyboard is a pluggable device.

The USB mouse sub-blockchain 104J is used to track a mouse that has been plugged into the communication device 101. The USB mouse sub-blockchain 104J may be stored in ROM in the USB mouse. The USB mouse sub-blockchain 104J is an assembly sub-blockchain 104J because the USB mouse comprises multiple components. The USB keyboard sub-blockchain 104J is also a device sub-blockchain 104 because the USB keyboard is a pluggable device.

The USB thumb drive sub-blockchain 104N is used to track a thumb drive that has been plugged into the communication device 101. The USB thumb drive sub-blockchain 104N may be stored in ROM in the USB thumb drive. The USB thumb drive sub-blockchain 104N is an assembly sub-blockchain 104J because the USB thumb drive comprises multiple components. The USB thumb drive sub-blockchain 104N is also a device sub-blockchain 104 because the USB thumb drive is a pluggable device.

The microprocessor can query each component, assembly, and/or device when they are plugged in or the component, assembly, and/or device can be created/added to the blockchain 103 when the microprocessor first powers up (e.g., programmed into firmware). A standard startup protocol may be used so that this process can be applied to different manufacturers. For example, a standard inventory process (e.g., a component/assembly/device registration protocol) could be embedded into firmware/software that identifies the current software/components/assemblies/devices.

The concept can be extended further to include other types of network devices. For example, a printer, a router, a gateway, a proxy server, a sensor, an Internet-of-Things (IoT) device, and/or the like could have a sub-blockchain 104. The sub-blockchain 104 may be part of a Simple Network Management Protocol (SNMP) Management Information Base (MIB) or other network accessible interface. A management system can be used to gather the sub-blockchains 104 to create a blockchain 103 of the network 110.

FIG. 3A is a diagram of a sub-blockchain 104A for a single component block 302B without a genesis block 200. FIG. 3A is an exemplary example of the microprocessor sub-blockchain 104A. In FIG. 3, there is only a single block (microprocessor block 302B) that has the information about the microprocessor. For example, the microprocessor block 302B may include information, such as, a manufacturer, a manufacture date, a test date, a version number, and/or the like.

FIG. 3B is a diagram of a sub-blockchain 104A for a single component block with a genesis block 200A. FIG. 3B is an exemplary example of the microprocessor sub-blockchain 104A. The microprocessor sub-blockchain 104A comprises a genesis block 200A and the microprocessor block 302B. The genesis block 200A is like a traditional genesis block that is used for blockchains 103. However, in some embodiments, the genesis block 200A may have empty forward hash/forward link fields that can be filled when the blockchain 103 is created using the sub-blockchains 104. The microprocessor block 302B is the same block (or may be different based on implementation) as in FIG. 3A. In one embodiment, the microprocessor block 302B may have a hash of the genesis block 200A. The microprocessor block 302A may have a forward link 310A as is done with traditional blockchains.

FIG. 3C is a diagram of an assembly sub-blockchain 104C that comprises a plurality of single component blocks 302A-302N without a genesis block 200. FIG. 3C is an exemplary example of the motherboard sub-blockchain 104C. The mother board blockchain 104C comprises a motherboard block 302A, the microprocessor block 302B, the memory block 302C, and the video processor block 302N. The forward links 310B-310N link the blocks 302A-302N together. FIG. 3 is an example of an assembly sub-blockchain 104A. The blocks 302B-302N may have a hash of the previous block. A device sub-blockchain 104 may have a similar type of structure.

FIG. 3D is a diagram of an assembly sub-blockchain 104C that comprises the plurality of single component blocks 302A-302N and a genesis block 200B. FIG. 3D comprises the genesis block 200B and the blocks 302A-302N. FIG. 3D comprises the forward links 310A-310N. The main difference between FIG. 3C and FIG. 3D is the addition of the genesis block 200B. In this embodiment, the mother board block 302A may have a hash of the genesis block 200B and a forward link 310A to the genesis block 200B.

Figure 4:
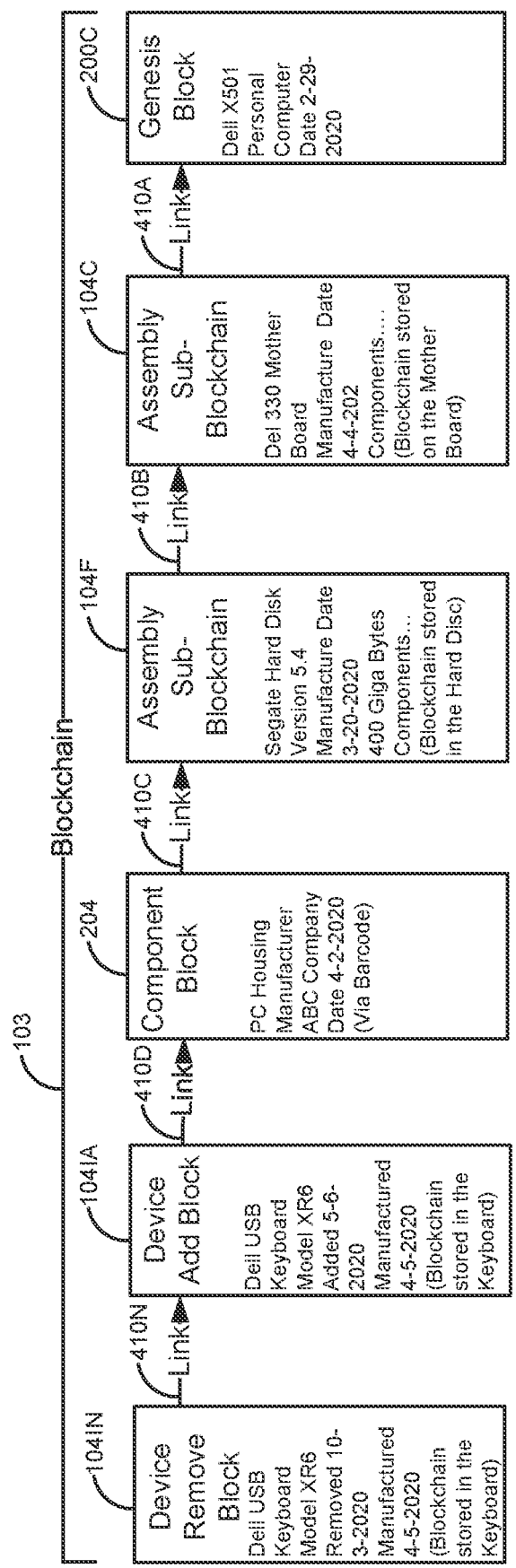
FIG. 4 is a diagram of a blockchain for tracking inventory.

FIG. 4 is a diagram of a blockchain 103 for tracking inventory. The blockchain 103 is what is generated when building an inventory of the components/assemblies/devices described in FIG. 2. The blockchain 103 only shows a subset of the all the sub-blockchains 104A-104N/204 for convenience. However, from the description, it would be obvious that sub-blockchains 104 for the missing components/assemblies/devices would be part of the blockchain 103.

The blockchain 103 comprises a genesis block 200C, the assembly sub-blockchain 104C (for the motherboard), the assembly sub-blockchain 104F (for the hard disk), the component sub-blockchain 204 (for the housing), a device adds sub-blockchain 104IA (added when the USB keyboard was plugged in), and a device remove sub-blockchain 104IN (added when the USB keyboard was unplugged). The sub-blockchains 104C, 104F, 204, 104IA, and 104IN may be like any of the sub-blockchains 104 described in FIG. 3 depending on implementation.

The blockchain 103 for a communication device 101, as shown in FIG. 4, may be dynamic. For example, the blockchain 103 may be dynamic depending on whether a USB thumb drive has been plugged in or is being removed. As shown in FIG. 4, the device add block 104IA is created when the USB keyboard is plugged in. Likewise, the device remove block 104IN is crated when the USB keyboard is removed. As a result, the blockchain 103 shows an inventory of components/assemblies/devices at any point in time.

In one embodiment, the blockchain 103 may not include the genesis block 200C because sub-blockchain 104C may have it own genesis block 200B. In this case, the genesis block 200C may not be necessary.

Figure 5:
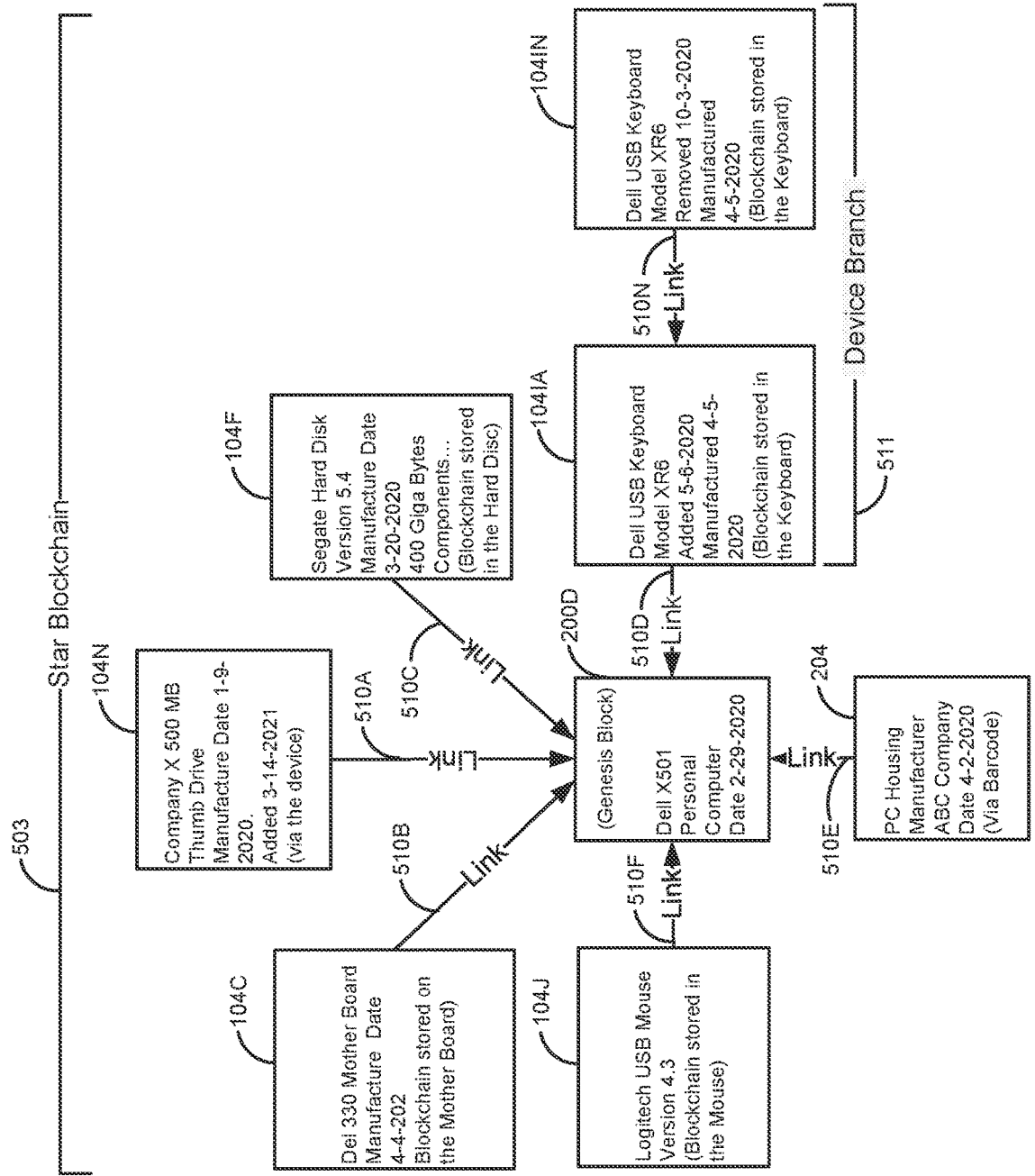
FIG. 5 is a diagram of a star blockchain for tracking inventory.

FIG. 5 is a diagram of a star blockchain 503 for tracking inventory. The star blockchain 503 comprises the sub-blockchains 104C, 104F, 104IA, 104IN, 104J, 104N, and 204. Each of the sub-blockchains 104C, 104F, 104IA, 104J, 104N, and 204 link to the genesis block 200D with forward links 510A-510F. In addition, the sub-blockchain 104IN has a forward link 501N to the sub-blockchain 104IA to form a device branch 511.

Like in FIG. 4, the star blockchain 503 does not show all the sub-blockchains 104 of FIG. 2. However, one of ordinary skill in the art would recognize that the missing sub-blockchain 104 would be part of the star blockchain 503.

Because the USB keyboard is a pluggable device, there can be multiple blocks/sub-blockchains 104 in the device branch 511. Each time the USB keyboard is added/removed, a new sub-blockchain 104I is added to the device branch to show a history of what hardware devices were plugged into the communication device 101 at any point in time. The blocks/sub-blockchains 104IA-104IN have information of what date/time the USB keyboard as added/removed.

The star blockchain 503 may be used for any of the processes described herein. For example, the star blockchain 503 may be used to track a network 110 of devices. The network 110 of devices can now be managed by a network management system where a network star blockchain 503 is created. In this case, the star blockchain 503 may have a hierarchy of star blockchains 503. For example, there could be a network/company genesis block 200. The individual device star blockchains 503 would then point to the network/company genesis block 200. This could be extended further to include branch locations. For example, the branch locations could be another star blockchain 503 in the hierarchical blockchain (a hierarchy of star blockchains 503). This provides a complete inventory of communication devices 101 that can be used in conjunction with the software/firmware inventory described in U.S. patent application Ser. No. 17/484,909, which is incorporated herein by reference.

In addition, the process of using sub-blockchains 104 can use machine learning to identify hardware incompatibility and thus identify potential failures. For example, if different USB devices that are plugged into USB port 1 tend to have more failures versus USB port 2, the system can flag the USB port #1. The machine learning can be also used to identify incompatibility errors. For example, if a thumb drive from manufacturer X tends to have more read/write errors, this can be flagged and 'learned' over time by associating the histories of multiple communication devices 101.

The concept of anomaly blocks/machine learning can be used to identify potential hardware components/assemblies/devices that are potentially going to fail or have failed. The anomaly blocks/sub-blockchains 104 can track various hardware specific anomalies, such as, voltage anomalies, temperature anomalies, memory failures, sector failures, a fan failure, key/keyboard failures, component incompatibility issues, counterfeit components (signature of the component does not match), and/or the like. An anomaly block/sub-blockchain 104 is a block/sub-blockchain 104 that gets added to the blockchain 103/503 when an anomaly (e.g., hardware specific issues, a failure, a parity error, a sector failure, etc.). The anomaly blocks/sub-blockchains 104 can be added to the individual branches if the star blockchain 503 is used. For example, an anomaly block/sub-blockchain 104 can be created for a sector failure of a hard disk at the end of the sub-blockchain 104F in FIG. 5. The machine learning can use data from other blockchains 103/503 of similar components/assemblies/devices as an input to identify potential hardware failures. For example, if there is a learned history of a specific component (e.g., a specific type of memory from a specific manufacturer (a learned hardware failure pattern)), this can be applied to another component/assembly/device and when the pattern seems to be replicated (or starts to follow the same pattern), then a user can be warned so that the component/assembly/device can be proactively replaced before a failure occurs.

This idea can be extended to controlling the environment of the communication device 101 in regards what devices can be plugged in. Blocks/sub-blockchains 104 can be dynamically added to the blockchain 103/503 that control what types of hardware can be plugged into to the communication device 101. For example, a block/sub-blockchain 104 may be added that indicates only specific types of pluggable devices can be added or indicates that specific devices (e.g., from a specific manufacturer) or pluggable device types (e.g., thumb drives) cannot be added based on a corporate policy. The process could also use trusted/non-trusted hardware list to block hardware additions to the device. A public key could be used for a denied list/allowed list to ensure that the proper kinds of hardware are being added to the device. The process could also be used to detect counterfeit components/assemblies.

Figure 6:
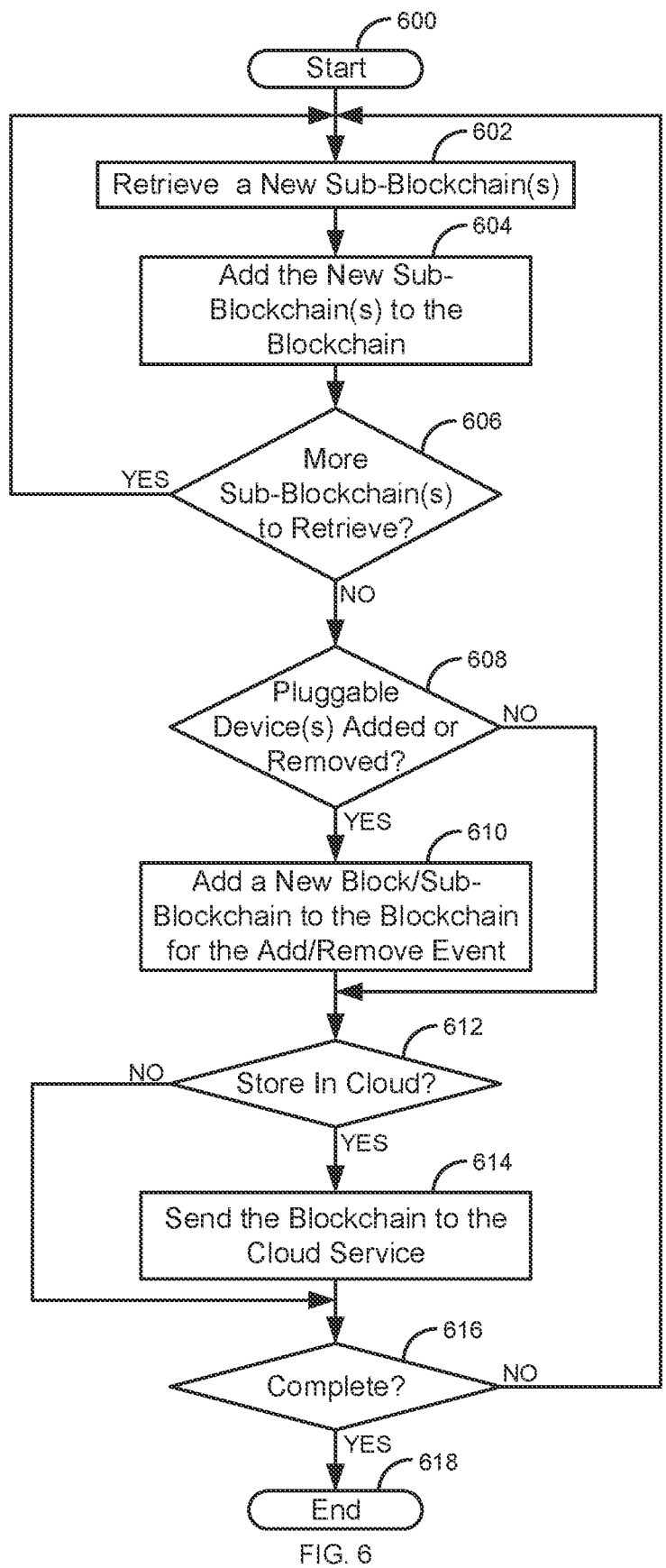
FIG. 6 is a flow diagram of a process for tracking inventory by retrieving sub-blockchains to create a blockchain.
Figure 7:
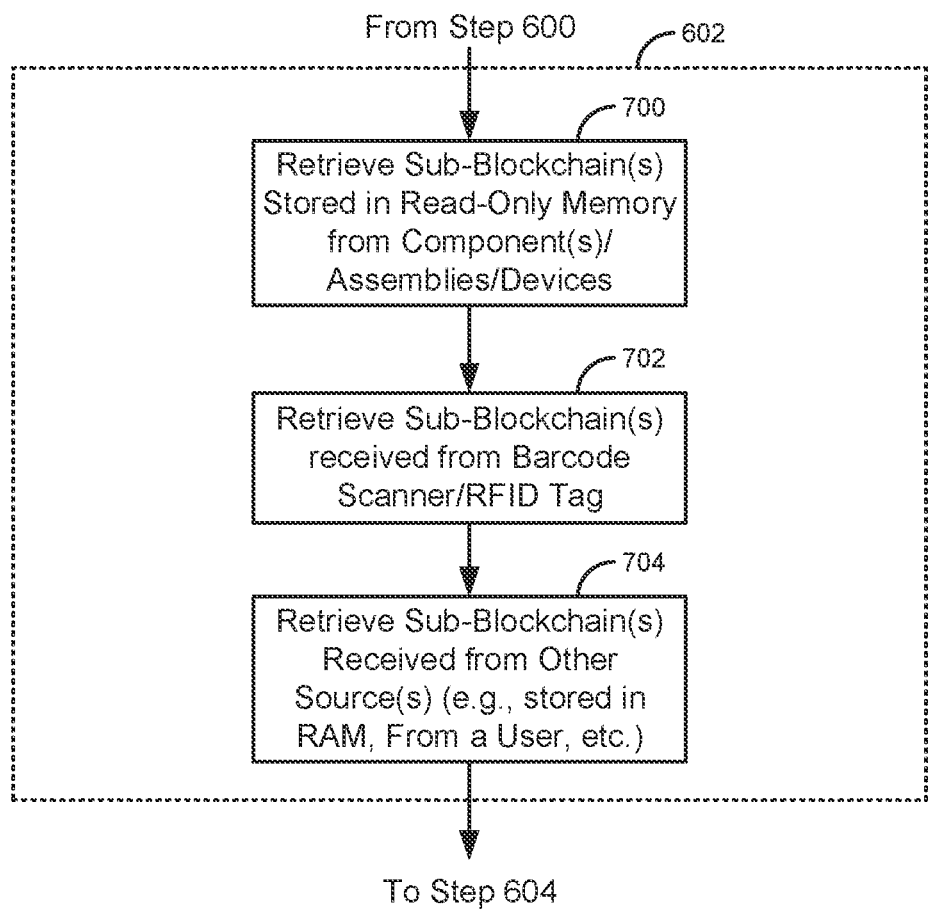
FIG. 7 is a flow diagram for retrieving sub-blockchains to create a blockchain.
Figure 8:
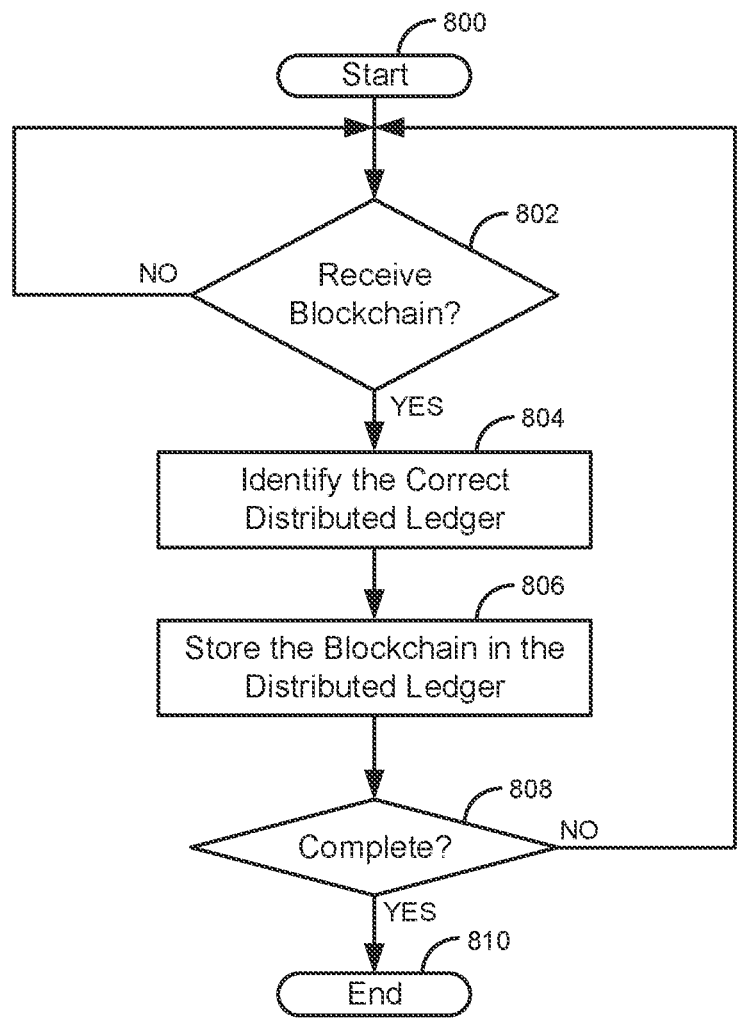
FIG. 8 is a flow diagram receiving and storing of a blockchain in a cloud service.

FIG. 6 is a flow diagram of a process for tracking inventory by retrieving sub-blockchains 104 to create a blockchain 103/503. Illustratively, the communication devices 101A-101N, the blockchain managers 102A-102N, the cloud service 120, the cloud blockchain manager 121, and the distributed ledger 122 are stored-program-controlled entities, such as a computer or microprocessor, which performs the method of FIGS. 6-8 and the processes described herein by executing program instructions stored in a computer readable storage medium, such as a memory (i.e., a computer memory, a hard disk, and/or the like). Although the methods described in FIGS. 6-8 are shown in a specific order, one of skill in the art would recognize that the steps in FIGS. 6-8 may be implemented in different orders and/or be implemented in a multi-threaded environment. Moreover, various steps may be omitted or added based on implementation.

The process starts in step 600. The blockchain manager 102 retrieves a new sub-blockchain(s) 104 in step 602. The blockchain manager 102 may retrieve the new sub-blockchain(s) in various ways, such as, reading from memory, detecting an event, using a predefined bootup protocol, and/or the like. The blockchain manager 102 adds the new sub-blockchain(s) 104 to the blockchain 103 in step 604. If it is the first sub-blockchain 104, the first sub-blockchain 104 may be added to a genesis block 200. The blockchain manager 102, determines, in step 606, if there are more sub-blockchain(s) 104 to retrieve. If there are more sub-blockchain(s) 104 to retrieve in step 606, the process goes back to step 602. If there are not any more sub-blockchains 104 to retrieve in step 606, the blockchain manager 102 determines, in step 608, if pluggable device(s) have been added or removed. If a pluggable device has not been added or removed in step 608, the process goes to step 612. If a pluggable device has been added or removed in step 608, the blockchain manager 102, adds a new block/sub-blockchain 104 for the add/remove event in step 610. The process then goes to step 612.

The blockchain manger 102 determines, in step 612, if the blockchain 103 is to be stored in the cloud service 120. For example, if the blockchain 103 is to be stored in the distributed ledger 122. If the blockchain 103 is not to be stored in the cloud service 120 in step 612, the process goes to step 616. Otherwise, if the blockchain 103 is to be stored in the cloud service 120 in step 612, the blockchain manger 102, sends, in step 614, the blockchain 103 to the cloud service 120 to store in the digital ledger 122. The process then goes to step 616. The steps of 612/614 may be optional based on implementation.

The blockchain manager 102 determines, in step 616, if the process is complete. If the process is not complete in step 616, the process goes back to step 602. Otherwise, if the process is complete in step 616, the process ends in step 618.

FIG. 7 is a flow diagram for retrieving sub-blockchains 104 to create a blockchain 103. FIG. 7 is an exemplary embodiment of step 602 of FIG. 6. After starting in step 600, the blockchain manager 102 retrieves, in step 700, sub-blockchain(s) 104 stored in Read-Only Memory (ROM) from components/assemblies/devices. The blockchain manager 102 retrieves, in step 702, sub-blockchain(s) 104 received from a barcode scanner/RFID scanner. The blockchain manger 102, retrieves, in step 704, sub-blockchain(s) 104 from other sources. For example, the other sources may be sub-blockchain(s) 104 stored in Random Access Memory (RAM), user defined sub-blockchain(s) 104, and/or the like. The process then goes to step 604.

FIG. 8 is a flow diagram receiving and storing of a blockchain 103/503 in a cloud service 120. The process starts in step 800. The cloud blockchain manager 121, waits in step 802, to receive a blockchain 103/503 (i.e., the blockchain 103/503 sent in step 614). If a blockchain 103/503 is not received in step 802, the process of step 802 repeats. Otherwise, if the blockchain 103/503 is received in step 802, the cloud blockchain manager 121 identifies the correct distributed ledger 122 in step 804. For example, if there are more than one tenants of the cloud service 120, the cloud blockchain manager 121 may use a tenant identifier to identify the correct distributed ledger 122 of the tenant. The cloud blockchain manager 121 stores the blockchain 103/503 as the device blockchain 123 in the distributed ledger 122 in step 806.

The cloud blockchain manager 121 determines, in step 808, if the process is complete. If the process is not complete in step 808, the process goes back to step 802. Otherwise, if the process is complete in step 808, the process ends in step 810.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements.

These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:
1. A system comprising:
a microprocessor; and
a computer readable medium, coupled with the microprocessor and comprising microprocessor readable and executable instructions that, when executed by the microprocessor, cause the microprocessor to:
retrieve a first sub-blockchain;

retrieve a second sub-blockchain, wherein at least one of first sub-blockchain and the second sub-blockchain was originally stored in a read-only computer memory or was originally stored in a barcode/Radio Frequency Identification (RFID) tag; and create a blockchain that comprises the first sub-blockchain and the second sub-blockchain, wherein the blockchain is used to track inventory of a product, wherein creating the blockchain comprises adding the second sub-blockchain to the first sub-blockchain and at least one of:

removing a genesis block from the second sub-blockchain before creating the blockchain;

adding a hash of a last block in the first sub-blockchain to a predefined hash field in a first block in the second sub-blockchain;

adding a link to the last block in the first sub-blockchain to a predefined link field in the first block in the second sub-blockchain; and creating the blockchain with a plurality of genesis blocks, wherein the plurality of genesis blocks are in the first sub-blockchain and the second sub-blockchain, and wherein a genesis block in the second sub-blockchain has a hash of the last block in the first sub-blockchain and a link to the last block in the first sub-blockchain.

2. The system of claim 1, wherein the at least one of the first sub-blockchain and the second sub-blockchain was originally stored in the read-only computer memory and wherein the creating the blockchain comprises removing the genesis block from the second sub-blockchain before creating the blockchain.

3. The system of claim 1, wherein the at least one of the first sub-blockchain and the second sub-blockchain comprises a plurality of blockchain blocks and at least one forward link between the plurality of blockchain blocks.

4. The system of claim 1, wherein the at least one of the first sub-blockchain and the second sub-blockchain was originally stored in the barcode/RFID tag and wherein the creating the blockchain comprises adding the hash of the last block in the first sub-blockchain to the predefined hash field in the first block in the second sub-blockchain.

5. The system of claim 1, wherein the creating the blockchain comprises creating the blockchain with the plurality of genesis blocks, wherein the plurality of genesis blocks are in the first sub-blockchain and the second sub-blockchain, and wherein the genesis block in the second sub-blockchain has the hash of the last block in the first sub-blockchain and the link to the last block in the first sub-blockchain.

6. The system of claim 1, wherein the at least one of the first sub-blockchain and the second sub-blockchain comprises at least one of:

a single component block without a genesis block;
the single component block and the genesis block;
an assembly sub-blockchain that comprises a plurality of single component blocks without the genesis block; and
an assembly sub-blockchain that comprises the plurality of single component blocks and the genesis block.

7. The system of claim 1, wherein the creating the blockchain comprises adding the link to the last block in the first sub-blockchain to the predefined link field in the first block in the second sub-blockchain and wherein the blockchain is a star blockchain, wherein the center of the star blockchain comprises a genesis block that each component sub-blockchain, each assembly sub-blockchain, and each device sub-blockchain of the product points to the genesis block.

8. The system of claim 7, wherein the blockchain comprises first and second genesis blocks for the first and second sub-blockchains and wherein the star blockchain comprises a hierarchy of star blockchains for a network of devices.

9. The system of claim 1, wherein the microprocessor readable and executable instructions further cause the microprocessor to:

determine that a pluggable device is added to the product;
in response to determining that the pluggable device is added to the product, add a device add block or sub-blockchain to the blockchain;
determine that a pluggable device has been removed from to the product; and
in response to determining that the pluggable device has been removed from the product, add a device remove block or sub-blockchain to the blockchain.

10. A method comprising:

retrieving, by a microprocessor, a first sub-blockchain;
retrieving, by the microprocessor, a second sub-blockchain, wherein at least one of first sub-blockchain and the second sub-blockchain was originally stored in a read-only computer memory or was originally stored in a barcode/Radio Frequency Identification (RFID) tag; and
creating, by the microprocessor, a blockchain that comprises the first sub-blockchain and the second sub-blockchain, wherein the blockchain is used to track inventory of a product, wherein the at least one of the first sub-blockchain and the second sub-blockchain comprises a plurality of blockchain blocks and at least one forward link between the plurality of blockchain blocks.

11. The method of claim 10, wherein the at least one of the first sub-blockchain and the second sub-blockchain was originally stored in the read-only computer memory and wherein the creating comprises filling in the at least one forward link when the blockchain is created.

12. The method of claim 10, wherein the at least one of the first sub-blockchain and the second sub-blockchain was originally stored in the barcode/RFID tag.

13. The method of claim 10, wherein the at least one of the first sub-blockchain and the second sub-blockchain comprises at least one of:

a single component block without a genesis block;
the single component block and the genesis block;
an assembly sub-blockchain that comprises a plurality of single component blocks without the genesis block; and
an assembly sub-blockchain that comprises the plurality of single component blocks and the genesis block.

14. The method of claim 10, wherein the blockchain is a star blockchain, wherein the center of the star blockchain comprises a genesis block that each component sub-blockchain, each assembly sub-blockchain, and each device sub-blockchain of the product points to the genesis block.

15. The method of claim 10, wherein creating the blockchain comprises adding the second sub-blockchain to the first sub-blockchain and at least one of:

removing a genesis block from the second sub-blockchain before creating the blockchain;
adding a hash of a last block in the first sub-blockchain to a predefined hash field in a first block in the second sub-blockchain;

adding a link to the last block in the first sub-blockchain to a predefined link field in the first block in the second sub-blockchain; and creating the blockchain with a plurality of genesis blocks, wherein the plurality of genesis blocks are in the first sub-blockchain and the second sub-blockchain, and wherein a genesis block in the second sub-blockchain has a hash of the last block in the first sub-blockchain and a link to the last block in the first sub-blockchain.

16. A system comprising:

a microprocessor; and a computer readable medium, coupled with the microprocessor and comprising microprocessor readable and executable instructions that, when executed by the microprocessor, cause the microprocessor to:

receive a blockchain, wherein the blockchain is created using a first sub-blockchain and a second sub-blockchain, wherein at least one of the first sub-blockchain and the second sub-blockchain is stored in a barcode/Radio Frequency Identification (RFID) tag, and wherein the blockchain is used to track inventory of a product; and store the received blockchain.

17. The system of claim 16, wherein the at least one of the first sub-blockchain and the second sub-blockchain comprises at least one of:

a single component block without a genesis block;

the single component block and the genesis block;

an assembly sub-blockchain that comprises a plurality of single component blocks without the genesis block; and an assembly sub-blockchain that comprises the plurality of single component blocks and the genesis block.

18. The system of claim 16, wherein the blockchain is a star blockchain, wherein the center of the star blockchain comprises a genesis block that each component sub-blockchain, each assembly sub-blockchain, and each device sub-blockchain of the product points to the genesis block.

19. The method of claim 10, wherein at least one of the first sub-blockchain and the second sub-blockchain comprises a genesis block and wherein the creating comprises removing the genesis block and recomputing a hash value associated with the blockchain.

20. The system of claim 16, wherein the barcode/Radio Frequency Identification (RFID) tag comprises a public key for the at least one of the first sub-blockchain and the second sub-blockchain, the public key being used to access the at least one of the first sub-blockchain and the second sub-blockchain.

* * * * *